(12) United States Patent  
Tsubosaka et al.

(10) Patent No.: US 10,547,058 B2  
(45) Date of Patent: *Jan. 28, 2020

(54) METHOD OF MANUFACTURING MEMBRANE ELECTRODE ASSEMBLY, AND MEMBRANE ELECTRODE ASSEMBLY

(71) Applicant: TOYOTA JIDOSHA KABUSHIKI KAISHA, Toyota-shi and Aichi-ken (JP)

(72) Inventors: Kenji Tsubosaka, Toyota (JP); Hiroo Yoshikawa, Toyota (JP); Tsunemasa Nishida, Nagoya (JP); Nobuaki Mizutani, Toyota (JP); Takeaki Saitou, Toyota (JP); Junji Nakanishi, Kasugai (JP); Masato Hamano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 203 days.

This patent is subject to a terminal disclaimer.

(21) Appl. No.: 14/883,116

(22) Filed: Oct. 14, 2015

(65) Prior Publication Data

US 2016/0133945 A1 May 12, 2016

(30) Foreign Application Priority Data

Nov. 7, 2014 (JP) ................. 2014-226629

(51) Int. Cl.  
*H01M 8/1004* (2016.01)  
*H01M 4/86* (2006.01)  
(Continued)

(52) U.S. Cl.  
CPC ....... *H01M 4/8882* (2013.01); *H01M 4/8663* (2013.01); *H01M 8/1004* (2013.01); *H01M 2008/1095* (2013.01); *Y02P 70/56* (2015.11)

(58) Field of Classification Search  
CPC ............. H01M 4/8882; H01M 8/1004; H01M 4/8663; H01M 2008/1095; Y02P 70/56  
See application file for complete search history.

(56) References Cited

U.S. PATENT DOCUMENTS

| | | | |
|---|---|---|---|
| 2012/0003572 A1 | 1/2012 | Matsumura et al. | |
| 2012/0058414 A1 | 3/2012 | Cho et al. | |
| 2014/0138586 A1* | 5/2014 | Meese-Marktscheffel | ................. B01J 23/882 |
| | | | 252/373 |

FOREIGN PATENT DOCUMENTS

| | | | |
|---|---|---|---|
| JP | 2004-127548 A | 4/2004 |
| JP | 2005-235556 | 2/2005 |

(Continued)

*Primary Examiner* — Milton I Cano  
*Assistant Examiner* — Philip A. Stuckey  
(74) *Attorney, Agent, or Firm* — Finnegan, Henderson, Farabow, Garrett & Dunner, LLP

(57) ABSTRACT

There is provided a method of manufacturing a membrane electrode assembly that has an electrode catalyst layer formed on a surface of an electrolyte membrane. The electrode catalyst layer formed in the membrane electrode assembly is produced by a drying process that dries a catalyst ink which includes catalyst-supported particles having a catalyst metal supported thereon, a solvent and an ionomer, at a predetermined temperature. The catalyst ink includes a plurality of different solvents having different boiling points. The predetermined temperature is set to be lower than the boiling point of the solvent having the lowest boiling point among the plurality of different solvents.

2 Claims, 11 Drawing Sheets

(51) Int. Cl.
*H01M 4/88* (2006.01)
*H01M 8/1018* (2016.01)

(56) References Cited

FOREIGN PATENT DOCUMENTS

| | | |
|---|---|---|
| JP | 2010-33731 A | 2/2010 |
| JP | 2012-069276 A | 4/2012 |
| JP | 2012-212661 | 11/2012 |
| KR | 10-2010-0121308 | 11/2010 |
| WO | WO 2011/099285 A1 | 8/2011 |

* cited by examiner

METHOD OF MANUFACTURING MEMBRANE ELECTRODE ASSEMBLY, AND MEMBRANE ELECTRODE ASSEMBLY

CROSS REFERENCE TO RELATED APPLICATION

The present application claims priority from Japanese patent application No. 2014-226629 filed on Nov. 7, 2014, the entirety of disclosure of which is hereby incorporated by reference into this application.

BACKGROUND

Field

The present invention relates to a method of manufacturing a membrane electrode assembly used for a fuel cell, and a membrane electrode assembly.

Related Art

A membrane electrode assembly (MEA) used for a fuel cell is a power generation element including an electrolyte membrane and electrodes (anode and cathode) formed on respective surfaces of the electrolyte membrane. Each of the electrodes includes an electrode catalyst layer that is placed to be in contact with the electrolyte membrane and a gas diffusion layer formed on the electrode catalyst layer.

JP 2005-235556A describes a method of manufacturing an electrode catalyst layer. The method coats a conductive porous body (for example, carbon paper) with a mixture of catalyst particles (for example, platinum-supported carbon fine particles), a hydrogen ion-conductive resin (for example, Nafion (registered trademark)) and a solvent (for example, alcohol) (this mixture is called "catalyst ink") and evaporates the solvent in an atmosphere at temperature of 60 to 80° C. to form catalyst layers. The method subsequently heats the formed catalyst layers at temperature of 100 to 140° C. in an atmosphere that includes oxygen of not lower than 2×10 Pa and not higher than the oxygen partial pressure of the air, so as to produce heat-treated electrode catalyst layers (more specifically, oxygen electrode catalyst layer and fuel electrode catalyst layer).

JP 2012-212661A describes another method of manufacturing an electrode catalyst layer. The method disperses catalyst particles, a polymer electrolyte and first carbon particles in a solvent to prepare a first catalyst ink and dries the first catalyst ink at temperature between 30° C. and 140° C. inclusive to obtain a catalyst aggregate. The method subsequently disperses the catalyst aggregate and second carbon particles in a second solvent to obtain a second catalyst ink. The method coats a base material with the second catalyst ink and dries coated layers of the second catalyst ink to form electrode catalyst layers.

A fluororesin (for example, Nafion (registered trademark)) that is a high-molecular polymer having a sulfonic acid group (—$SO_3H$) as an end group is often used as an electrolyte material or more specifically an ionomer included in an electrode catalyst layer. The high-molecular polymer is likely to be deteriorated (decomposed) from its end group. Radial decomposition by the chemical action during power generation, as the measure factor, may cause decomposition of the sulfonic acid group of the ionomer in the electrode catalyst layer and thereby increase sulfate ion ($SO_4^{2-}$). This may decrease pH in the fuel cell or more specifically in the membrane electrode assembly of the fuel cell to provide an acidic environment and cause poisoning of the electrode catalyst layer. Poisoning of the electrode catalyst layer may result in reducing the proton conductivity of the electrode catalyst layer and increasing the impedance of an electrode comprised of the electrode catalyst layer and a gas diffusion layer and may thus lead to reducing the power generation performance of the fuel cell. A radical scavenger (for example, cerium oxide) included in the gas diffusion layer of the membrane electrode assembly is used to suppress an increase of sulfate ion during power generation.

The inventors of the present application have found that the sulfonic acid group of the ionomer is decomposed by the action of the catalyst and the heat applied in the process of manufacturing the electrode catalyst layer or more specifically in its drying process to generate sulfate ion ($SO_4^{2-}$) and thereby cause poisoning of the electrode catalyst layer. The inventors have also found that direct combustion of the solvent included in the catalyst ink by the action of the catalyst and the heat in the drying process accelerates decomposition of the ionomer. This causes poisoning of an electrode catalyst layer even in an initial stage of a fuel cell (or more specifically membrane electrode assembly) and causes problems such as reduction of the proton conductivity of the electrode catalyst layer and increase in impedance of the electrode comprised of the electrode catalyst layer and the gas diffusion layer.

Neither JP 2005-235556A nor JP 2012-212661A describes that combustion of the solvent in the catalyst ink accelerates generation of sulfate ion by decomposition of the ionomer, so as to cause poisoning of the electrode catalyst layer even in the initial stage of the fuel cell (membrane electrode assembly) and cause problems such as reduction of the proton conductivity of the electrode catalyst layer and increase in impedance of the electrode.

SUMMARY

In order to solve at least part of the above problems, the invention may be implemented by any of the following aspects.

(1) According to one aspect of the invention, there is provided a method of manufacturing a membrane electrode assembly that has an electrode catalyst layer formed on a surface of an electrolyte membrane. This manufacturing method produces the electrode catalyst layer formed in the membrane electrode assembly by a drying process that dries a catalyst ink which includes catalyst-supported particles having a catalyst metal supported thereon, a solvent and an ionomer, at a predetermined temperature. The catalyst ink includes a plurality of different solvents having different boiling points. The predetermined temperature is set to be lower than the boiling point of the solvent having the lowest boiling point among the plurality of different solvents.

The method of manufacturing the membrane electrode assembly according to this aspect suppresses combustion of the respective solvents included in the catalyst ink at the drying process and thereby suppresses accelerative generation of sulfate ion by decomposition of the ionomer. This accordingly suppresses the electrode catalyst layer from being poisoned in a resulting fuel cell using this membrane electrode assembly and remedies problems such as reduction of the proton conductivity of the electrode catalyst layer and increase in impedance of the electrode of the membrane electrode assembly.

(2) In the method of manufacturing the membrane electrode assembly according to the above aspect, the catalyst ink may include at least two different solvents having different boiling point. The drying process may comprise a first drying process that sets the predetermined temperature to a temperature that is lower than the boiling point of the solvent having the lower boiling point between the two different solvents; and a second drying process that is performed after the first drying process and sets the predetermined temperature to be higher than the temperature in the first drying process but lower than the boiling temperature of the other solvent.

The solvent having the lower boiling point is more easily evaporated and dried, After completion of evaporation of a solvent, even a temperature rise to be higher than the boiling point of the solvent does not cause sulfate ion to be generated by combustion of the solvent. The first drying process dries one solvent having the lower boiling point at the temperature lower than the boiling point of the one solvent. The second drying process dries the other solvent at the temperature that is higher than the temperature in the first drying process but is lower than the boiling point of the other solvent. This suppresses generation of sulfate ion by combustion of the respective solvents, while reducing the time duration required for drying.

(3) The method of manufacturing the membrane electrode assembly according to the above aspect may further comprise, after the drying process, measuring an amount of sulfate ion included in the produced electrode catalyst layer and evaluating an electrode catalyst layer having the measured amount of sulfate ion that is equal to or less than a specified reference value, as a good product.

The method of manufacturing the membrane electrode assembly according to this aspect readily selects the electrode catalyst layer that has a small amount of sulfate ion and has a low potential for poisoning, based on the specified reference value, to be used as a non-defective electrode catalyst layer. This accordingly suppresses the electrode catalyst layer from being poisoned in a resulting fuel cell using the manufactured membrane electrode assembly and remedies problems such as reduction of the proton conductivity of the electrode catalyst layer and increase in impedance of the electrode of the membrane electrode assembly.

(4) In the method of manufacturing the membrane electrode assembly according to the above aspect, the reference value may be an amount of sulfate ion corresponding to an inflection point of output current density obtained from a relationship that is specified in advance between amount of sulfate ion included in the electrode catalyst layer in unused state and output current density of a fuel cell using the electrode catalyst layer.

In the method of manufacturing the membrane electrode assembly according to this aspect, the reference value is set to a value that suppresses poisoning of the electrode catalyst layer and remedies problems such as reduction of the proton conductivity of the electrode catalyst layer and increase in impedance of the electrode of the membrane electrode assembly. This facilitates selection of the electrode catalyst layer to be used as a non-defective electrode catalyst layer for the membrane electrode assembly.

(5) In the method of manufacturing the membrane electrode assembly according to the above aspect, the reference value may be 0.33 $\mu g/cm^2$.

(6) According to another aspect of the invention, there is provided a membrane electrode assembly that has an electrode catalyst layer formed on a surface of an electrolyte membrane. The electrode catalyst layer includes an ionomer and catalyst-supported particles having a catalyst metal supported thereon. An amount of sulfate ion included in the electrode catalyst layer in unused state is equal to or less than a specified reference value.

In the membrane electrode assembly according to this aspect, the amount of sulfate ion included in the electrode catalyst layer is equal to or less than the specified reference value. This suppresses the electrode catalyst layer from being poisoned in a resulting fuel cell using the membrane electrode assembly including this electrode catalyst layer and remedies problems such as reduction of the proton conductivity of the electrode catalyst layer, increase in impedance of the electrode of the membrane electrode assembly and reduction of power generation performance of the fuel cell.

(7) in the membrane electrode assembly according to the above aspect, the reference value may be an amount of sulfate ion corresponding to an inflection point of output current density obtained from a relationship that is specified in advance between amount of sulfate ion included in the electrode catalyst layer in unused state and output current density of a fuel cell using the electrode catalyst layer.

In the membrane electrode assembly of this aspect, the reference value is set to a value that suppresses poisoning of the electrode catalyst layer and remedies problems such as reduction of the proton conductivity of the electrode catalyst layer, increase in impedance of the electrode of the membrane electrode assembly and reduction of power generation performance of the fuel cell. This suppresses the electrode catalyst layer from being poisoned in a resulting fuel cell using the membrane electrode assembly including this electrode catalyst layer and remedies problems such as reduction of the proton conductivity of the electrode catalyst layer and increase in impedance of the electrode of the membrane electrode assembly.

(8) in the membrane electrode assembly according to the above aspect, the reference value may be 0.33 $\mu g/cm^2$.

The invention may be implemented by any of various aspects other than the membrane electrode assembly and the method of manufacturing the membrane electrode assembly described above, for example, an electrode catalyst layer, a fuel cell, a method of manufacturing an electrode catalyst layer and a method of manufacturing a fuel cell.

DESCRIPTION OF THE EMBODIMENTS

Figure 1:
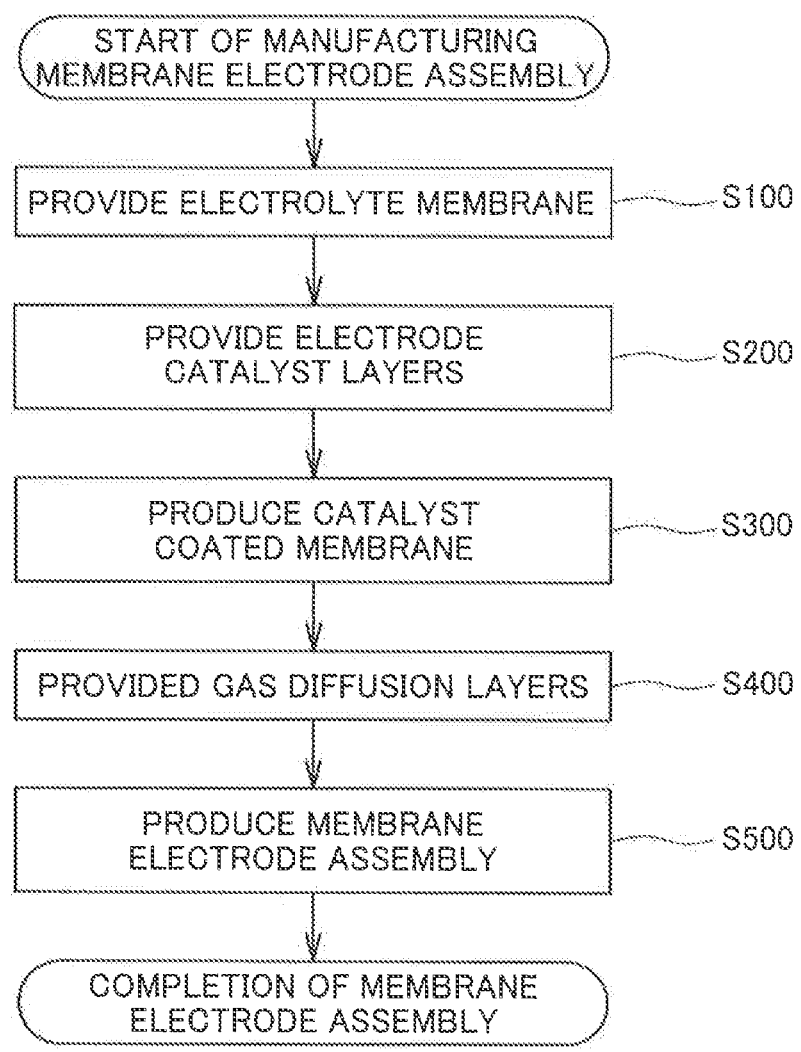
FIG. 1 is a flowchart showing a method of manufacturing a membrane electrode assembly used for a fuel cell according to one embodiment.

FIG. 1 is a flowchart showing a method of manufacturing a membrane electrode assembly used for a fuel cell according to one embodiment. This manufacturing method provides an electrolyte membrane (step S100), provides electrode catalyst layers (step S200), produces a catalyst coated membrane (CCM) by using the provided electrolyte membrane and electrode catalyst layers (step S300), provides gas diffusion layers (GEL) (step S400) and produces a membrane electrode assembly (MEM by using the produced catalyst coated membrane and the provided gas diffusion layers (step S500), as described in detail below.

The electrolyte membrane provided at step S100 is a proton-conductive ion exchange resin membrane that is made of an ionomer having a sulfonic acid group as an end group, like an ionomer included in an electrode catalyst layer described later. This embodiment uses a Nafion membrane made of Nafion (registered trademark) as the electrolyte membrane.

At step S200, electrode catalyst layers are provided by producing electrode catalyst layers and examining the produced electrode catalyst layers as described below.

Figure 2:
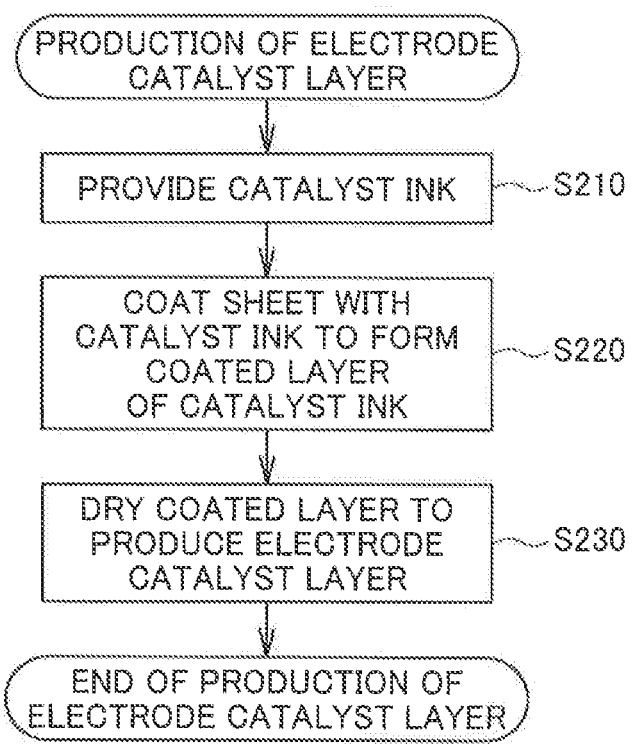
FIG. 2 is a flowchart showing a production process of an electrode catalyst layer.

FIG. 2 is a flowchart showing a production process of the electrode catalyst layer. At step S210, catalyst ink is provided. The catalyst ink may be produced (prepared) by for example, the following process. Catalyst-supported particles provided are mixed with water (ion exchange water) and are subsequently mixed with a plurality of hydrophilic solvents (hereinafter simply called "solvents") such as ethanol and propanol and an ionomer provided. The resulting mixture is dispersed using, for example, an ultrasonic homogenizer or a bead mill, so that the catalyst ink is produced. The foregoing process is, however, not restrictive, and the catalyst ink may be produced by any of various conventional techniques.

The catalyst-supported particles may be produced by, for example, the following process. Conductive particles for supporting that are capable of supporting a catalyst metal are dispersed in a solution of the catalyst metal, and the catalyst-supported particles are produced by impregnation method, coprecipitation method, ion exchange method or the like. The particles for supporting may be selectable from various carbon particles (carbon powders). For example, carbon black or carbon nanotubes may be used as the particles for supporting. The catalyst metal used may be platinum or a platinum compound (for example, platinum-cobalt alloy or platinum-nickel alloy). The ionomer used for production of the electrode catalyst layer is a proton-conductive electrolyte material having a sulfonic acid group as an end group. This embodiment employs Nafion (registered trademark) for the ionomer, like the electrolyte membrane. The foregoing process is, however, not restrictive, and the catalyst-supported particles may be produced by any of various conventional technique.

The production process subsequently coats a sheet (also called "based material") with the catalyst ink to form a coated layer of catalyst ink at step S220 and dries the coated layer of catalyst ink to form an electrode catalyst layer on the sheet at step S230.

Figure 3:
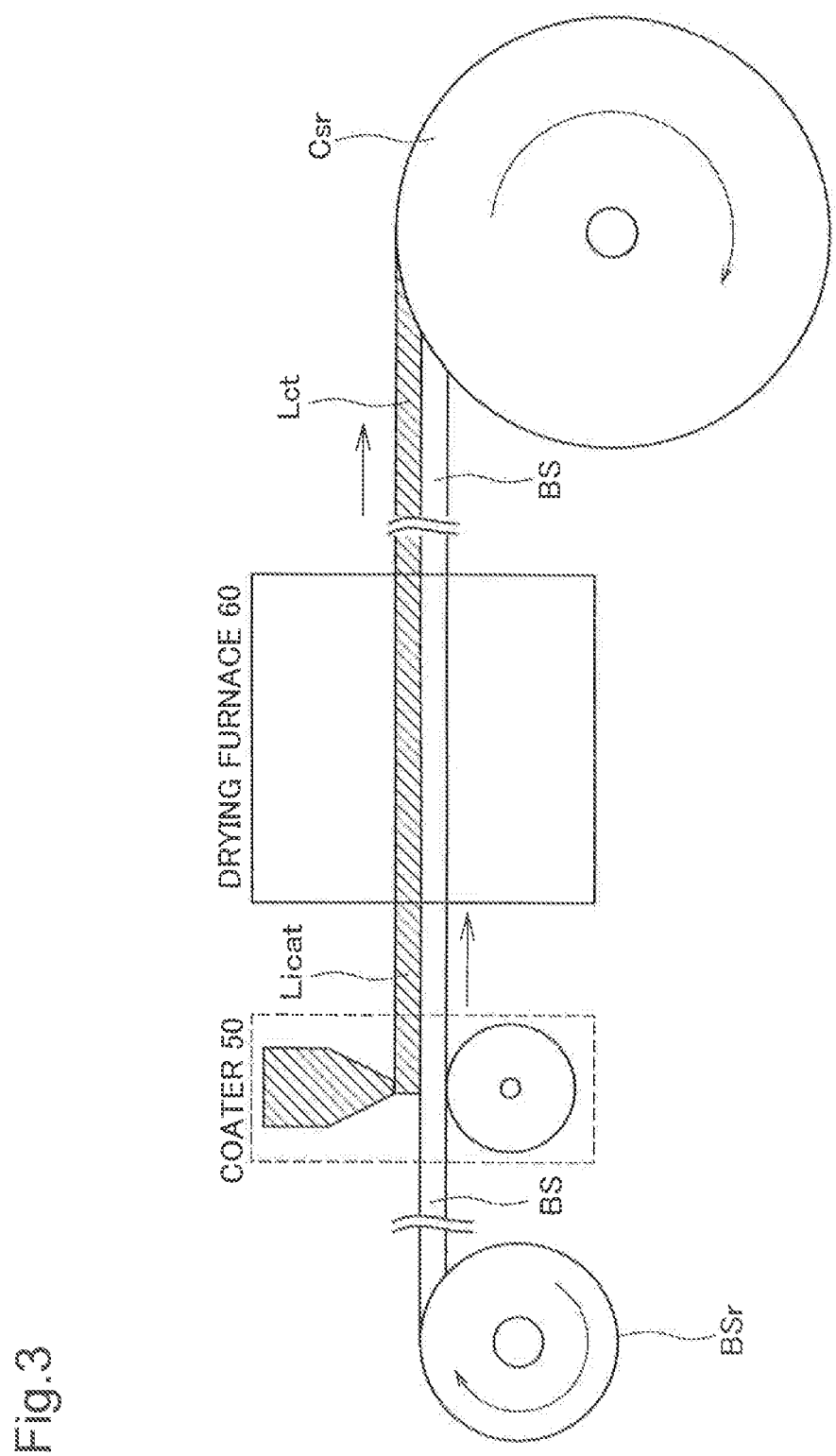
FIG. 3 is a diagram illustrating an example of a process of coating a sheet with catalyst ink and a process of drying a coated layer of catalyst ink.

FIG. 3 is a diagram illustrating an example of the process of coating a sheet with the catalyst ink and the process of drying a coated layer of catalyst ink. As shown in FIG. 3, at step S220, a long sheet BS wound off from a sheet roll BSr is coated with the catalyst ink by using a coater (for example, die coater) 50, so that a coated layer of catalyst ink Licat is formed on the sheet BS.

Referring back to 2, at step S230, the coated layer of catalyst ink Licat formed on the sheet BS is dried by a drying process (heating process) in a drying furnace 60, so that an electrode catalyst layer Lct is formed on the sheet BS. The sheet BS with the electrode catalyst layer Lct formed on the surface thereof is wound on a roll as an electrode catalyst layer sheet roll Csr.

Figure 4:
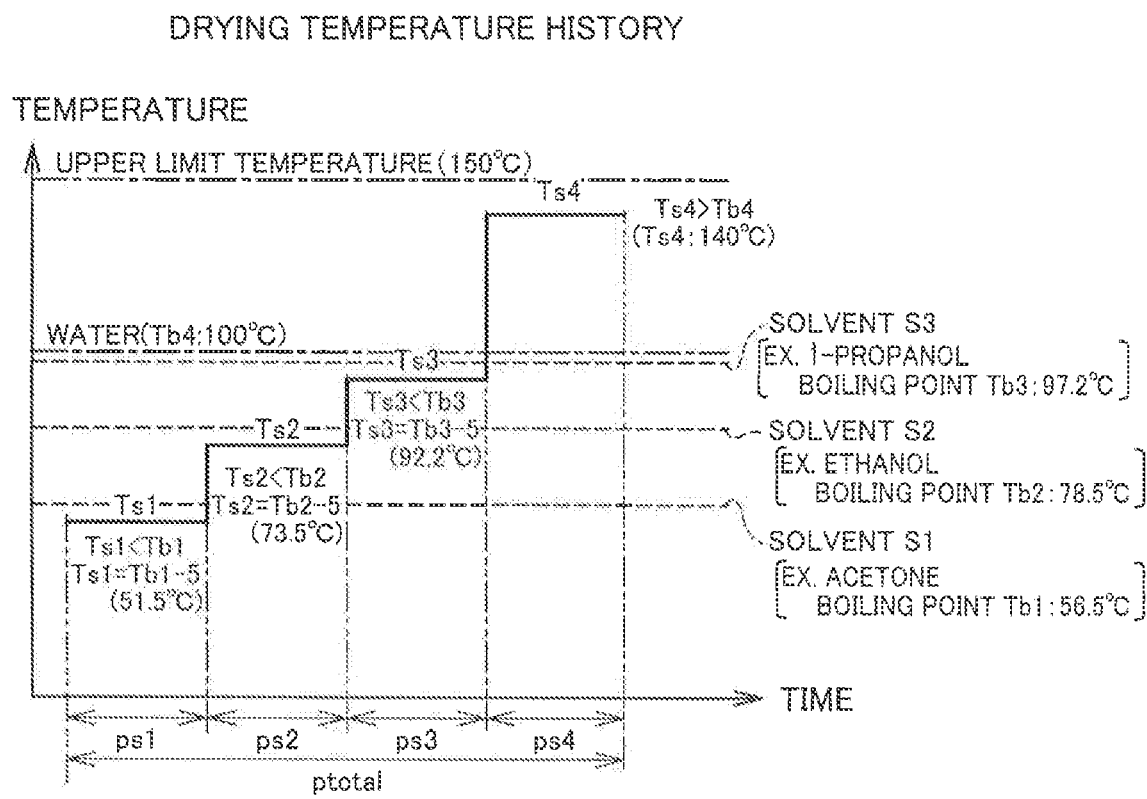
FIG. 4 is a diagram showing one example of drying temperature history in a drying furnace.

FIG. 4 is a diagram showing one example of drying temperature history in the drying furnace. The coated layer of catalyst ink Licat fed into the drying furnace 60 of FIG. 3 is sequentially heated to drying temperatures according to a drying temperature history set in the drying furnace 60 and is dried. In the example of drying temperature history shown in FIG. 4, the catalyst ink includes three different solvents S1, S2 and S3 and water. The first solvent S1 is acetone (boiling point Tb1: 56.5° C.), the second solvent S2 is ethanol (boiling point Tb2: 78.5° C.), and the third solvent S3 is 1-propanol (boiling point Tb3: 97.2° C.).

The drying process sequentially dries the coated layer of catalyst ink Licat in the drying furnace 60. The coated layer of catalyst ink Licat is first dried at a first temperature (also called "first drying temperature") Ts1 that is lower than the first boiling point Tb1 of the first solvent S1 for a first time duration (also called "first drying time duration") ps1. The coated layer of catalyst ink Licat is subsequently dried at a second drying temperature Ts2 that is higher than the first boiling temperature Tb1 but is lower than the second boiling temperature Tb2 of the second solvent S2 for a second drying time duration ps2. The coated layer of catalyst ink Licat is then dried at a third drying temperature Ts3 that is higher than the second boiling temperature Tb2 but is lower than the third boiling temperature Tb3 of the third solvent S3 for a third drying time duration ps3. As a result, the three different solvents S1, S2 and S3 are respectively evaporated. In the course of evaporation of these three different solvents S1, S2 and S3, water included in the catalyst ink is also evaporated. This almost completely dries the coated layer of catalyst ink Licat (by 95% or higher in this example). The coated layer of catalyst ink Licat is lastly heated to a heating temperature Ts4 (for example, 140° C.) that is higher than the third boiling point Tb3 and boiling point Tb4 of water (100° C.) but is not higher than an upper limit temperature (for example, 150° C.) for a heating time ps4. This series of drying and heating process thus sequentially dries the coated layer Licat of catalyst ink fed into the drying furnace 60 to form the electrode catalyst layer Lct.

As described above, the drying and heating process with the drying furnace 60 is performed according to the drying temperature history (shown in FIG. 4) at step S230. The drying process is performed to sequentially dry the coated layer Licat of catalyst ink at the drying temperatures Ts1, Ts2 and Ts3, which respectively depend on the boiling points Tb1, Tb2 and Tb3 of the three different solvents S1, S2 and S3 included in the catalyst ink. The heating process is subsequently performed to heat the coated layer Licat of catalyst ink at the heating temperature Ts4 that is higher than the highest third boiling point Tb3 and the boiling point Tb4 of water, so as to form the electrode catalyst layer Lct on the sheet BS.

The three-stage drying temperatures Ts1, Ts2 and Ts3 are respectively set to be lower than the boiling points Tb1, Tb2 and Tb3 of the respective solvents S1, S2 and S3 as described above. By taking into account some margins, it is preferable that the drying temperatures Ts1, Ts2 and Ts3 are respectively lower than the boiling points Tb1, Tb2 and Tb3 of the respective solvents S1, S2 and S3 by at least 5° C. Setting the drying temperature to be significantly lower than the boiling point, however, increases the drying time duration. By taking into account the time efficiency, it is preferable that the drying temperature is as close as the boiling temperature. In this example, the respective drying temperatures Ts1, Ts2 and Ts3 are set to be lower than the boiling points Tb1, Tb2 and Tb3 of the respective solvents S1, S2 and S3 by 5° C. as follows:

$$Ts1=[Tb1\cdot5]=51.5°\text{ C.};$$

$$Ts2=[Tb2\cdot5]=73.5°\text{ C.};$$

$$Ts3=[Tb3\cdot5]=92.2°\text{ C.};$$

The drying time durations ps1, ps2 and ps3 at the respective drying temperatures Ts1, Ts2 and Ts3 are set to time durations required for evaporation and drying, according to the amounts of the respective solvents. The drying time durations ps1, ps2 and ps3 and the heating time ps4 are sequentially set from the inlet side toward the outlet side in the drying furnace 60 and are determined according to the lengths of respective sections set at the respective drying temperatures Ts1, Ts2, Ts3 and Ts4 in the drying furnace 60 and the feeding speed.

The heating to Ts4 is not specifically limited, as long as the heating temperature Ts4 is higher than the boiling point of the solvent having the highest boiling point (third boiling point Tb3 of the third solvent 53 in this example) and the boiling point Tb4 of water and is not higher than the upper limit temperature. The upper limit temperature is preferably not higher than 150° C. and is more preferably not higher than 145° C. The heating process at the heating temperature Ts4 may be omitted as appropriate. In the case where this heating process is omitted, however, it is preferable to set the drying time durations at the respective drying temperatures to complete drying by the drying process at the three-stage drying temperatures.

The solvent having the lower boiling point is more easily evaporated and dried. After completion of evaporation of a solvent, even a temperature rise to be higher than the boiling point of the solvent does not cause sulfate ion to be generated by combustion of the solvent. Accordingly, the drying process at the gradually increased temperatures depending on the points of the respective solvents like the drying temperature history described above suppresses generation of sulfate ion by combustion of the solvent and reduces the time duration required for drying.

Figure 5:
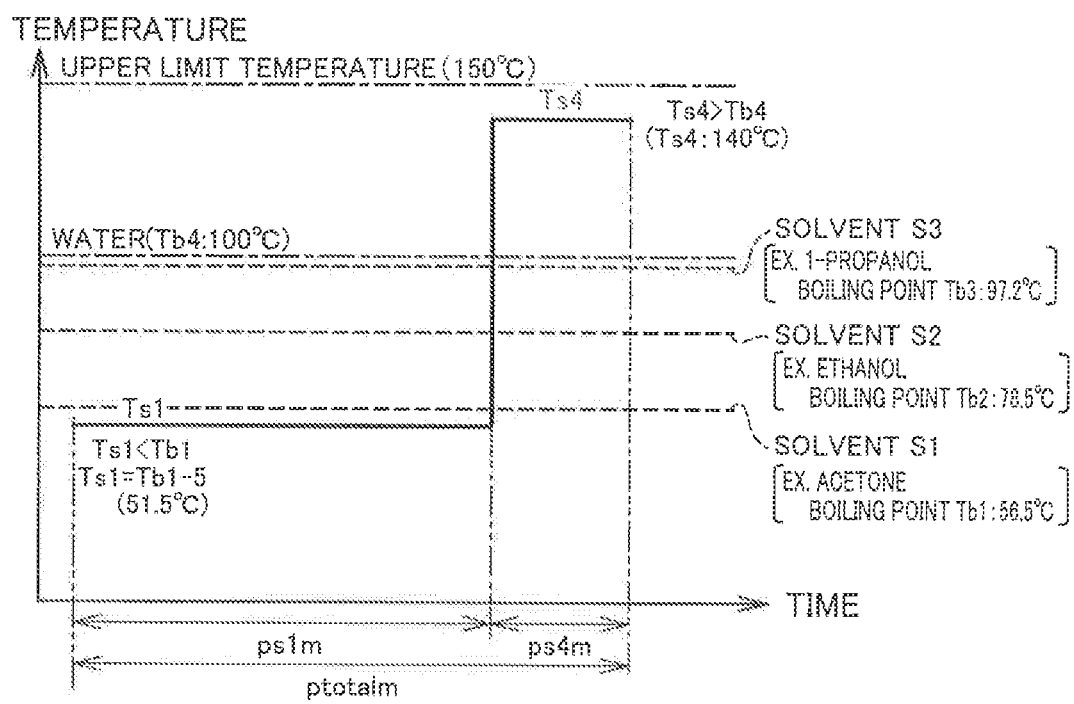
FIG. 5 is a diagram showing another example of drying temperature history in the drying furnace.

FIG. 5 is a diagram showing another example drying temperature history in the drying furnace. The conditions of the catalyst ink are identical with those in FIG. 4. The drying temperature history of FIG. 4 performs the drying process at the gradually increased three-stage temperatures Ts1, Ts2 and Ts3. The drying temperature history of FIG. 5, however, almost completes drying (95% or more) at the first drying temperature Ts1 with respect to the first solvent S1 having the lowest boiling point (acetone in the illustrated example) and subsequently performs the heating process at the heating temperature Ts4 for a heating time ps4m.

The drying process according to the drying temperature history of FIG. 5 dries the coated layer of catalyst ink Licat at the drying temperature determined depending on the boiling point of the solvent having the lowest boiling point, thus suppressing generation of sulfate ion by combustion of the solvent. The drying temperature history of FIG. 5 requires the longer time duration for drying, compared with the drying temperature history of FIG. 4.

The heating process may also be omitted in the drying temperature history of FIG. 5. In the case where this heating process is omitted, however, it is preferable to set the drying time duration to complete drying at the drying temperature determined depending on the boiling point of the solvent having the lowest boiling point.

In the above examples, the catalyst ink includes three different solvents S1, S2 and S3 and water. In another example, the catalyst ink may include only one type of solvent and water. In this example, the coated layer of catalyst ink may be dried at a drying temperature that is lower than the boiling point of this one single solvent. In another example, the catalyst ink may include four or more different solvents. In this example, the coated layer of catalyst ink may be dried sequentially at drying temperatures that are increased gradually and are respectively set to be lower than the boiling points of the corresponding single solvents in the sequence from the solvent having the lowest boiling point to the solvent having the highest boiling point.

Figure 6:
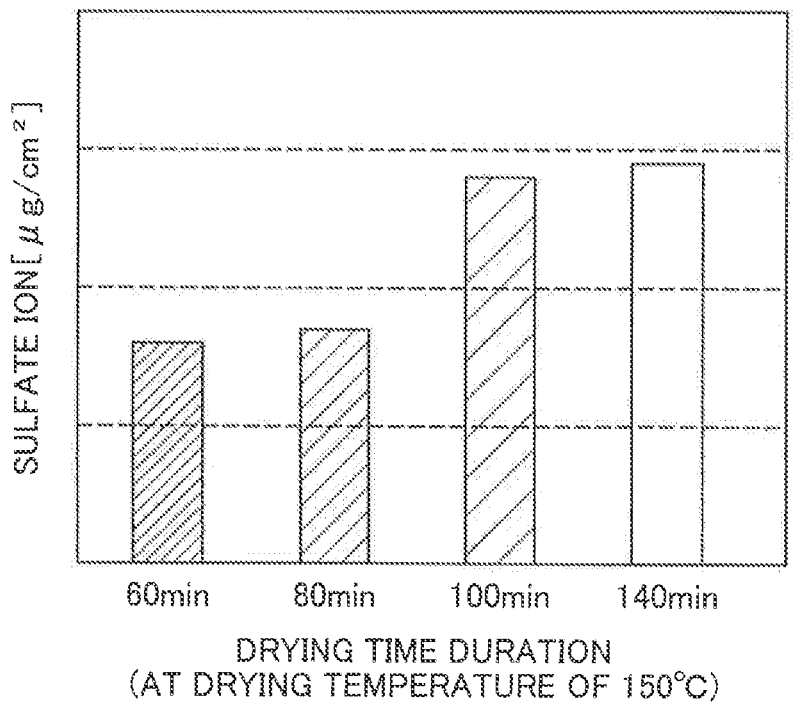
FIG. 6 is a graph showing a relationship between drying time duration and amount of sulfate ion in the electrode catalyst layer.

FIG. 6 is a graph showing a relationship between the drying time duration and the amount of sulfate ion in the electrode catalyst layer, FIG. 6 shows the results of measurement of sulfate ion in electrode catalyst layers produced at a fixed drying temperature of 150° C. for drying time durations of 60 minutes, 80 minutes, 100 minutes and 140 minutes. The conditions of the catalyst ink are identical with those in FIGS. 4 and 5. The amount of sulfate ion is measured by analysis of ion components included in an extract that is obtained by soaking the electrode catalyst layer in warm water, by ion chromatography.

As indicated by FIG. 6, even at the drying temperature of 150° C. that is higher than the boiling points of the solvents S1, S2 and S3 setting the drying time duration to be not longer than 80 minutes suppresses generation of sulfate ion. Setting the short drying time duration at the higher drying temperature than the boiling point of the solvent can suppress generation of sulfate ion by combustion of the solvent. The drying temperature and the drying time duration may be determined according to the catalyst ink used by experimentally checking in advance the temperature and the time duration that evaporate all the solvents to complete drying and suppress generation of sulfate ion by combustion of the solvent.

Figure 7:
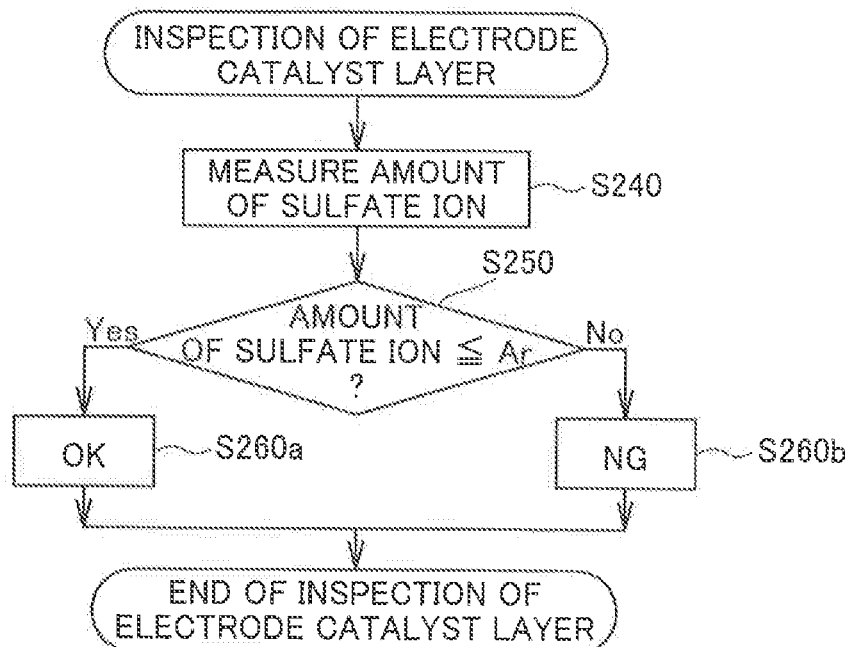
FIG. 7 is a flowchart showing an inspection process of the electrode catalyst layer.

FIG. 7 is a flowchart showing an inspection process of the electrode catalyst layer. The inspection process measures the amount of sulfate ion included in the electrode catalyst layer (step S240) and determines whether the amount of sulfate ion is equal to or less than a specified reference value Ar [μg/cm$^2$] (step S250), A concrete example of the reference value Ar will be described later.

Figure 8:
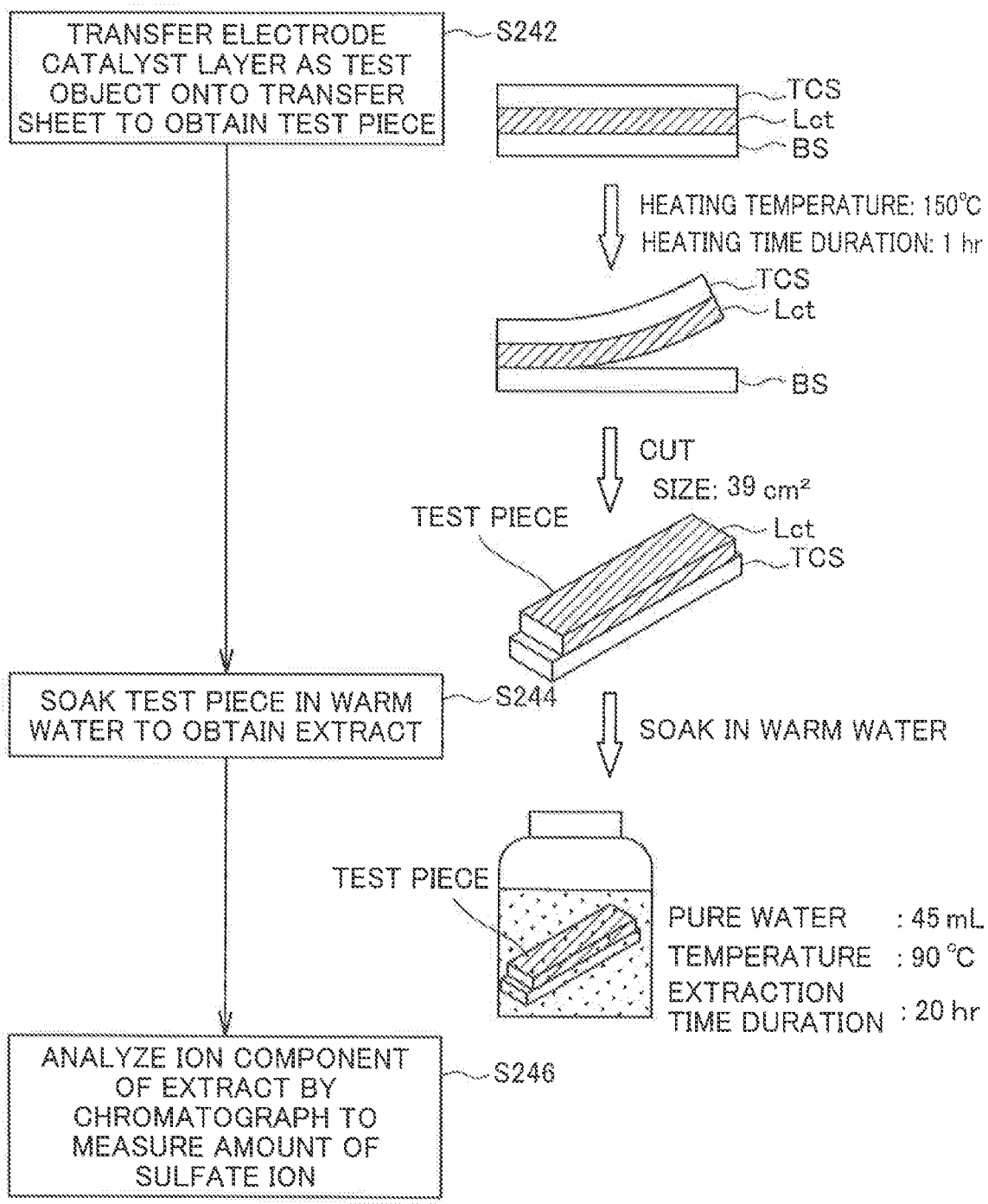
FIG. 8 is a flowchart showing a procedure of measuring the amount of sulfate ion in the electrode catalyst layer.

FIG. 8 is a flowchart showing a procedure of measuring the amount of sulfate ion in the electrode catalyst layer. The procedure first transfers part of the electrode catalyst layer Lct of the electrode catalyst layer sheet roll Csr (shown in FIG. 3) onto a transfer sheet TCS to obtain a test piece (step S242). Any of various resin sheets such as polyimide sheet may be used as the transfer sheet TCS. This example uses a Kapton (registered trademark) sheet. The procedure stacks the transfer sheet TCS on a surface of the electrode catalyst layer Lct, presses the stacked layers and treats the pressed layers by heat treatment at a heating temperature of 150° C. for a heating time duration of 1 hour, so as to transfer the electrode catalyst layer Lct onto the transfer sheet TCS. A test piece may be obtained by cutting the transferred electrode catalyst sheet Lct into, for example, a size of 39 cm$^2$. The size of the test piece is not specifically limited to this size.

The procedure subsequently soaks the obtained test piece in warm water to obtain an extract (step S244). In this example, an extract is obtained by soaking the test piece in 45 mL of pure water at a temperature of 90° C. for an extraction time duration of 20 hours. The conditions of warm water immersion are not limited to these conditions but may be any suitable conditions that enable sulfate ion as the measuring object to be sufficiently extracted from the electrode catalyst layer of the test piece.

Figure 9:
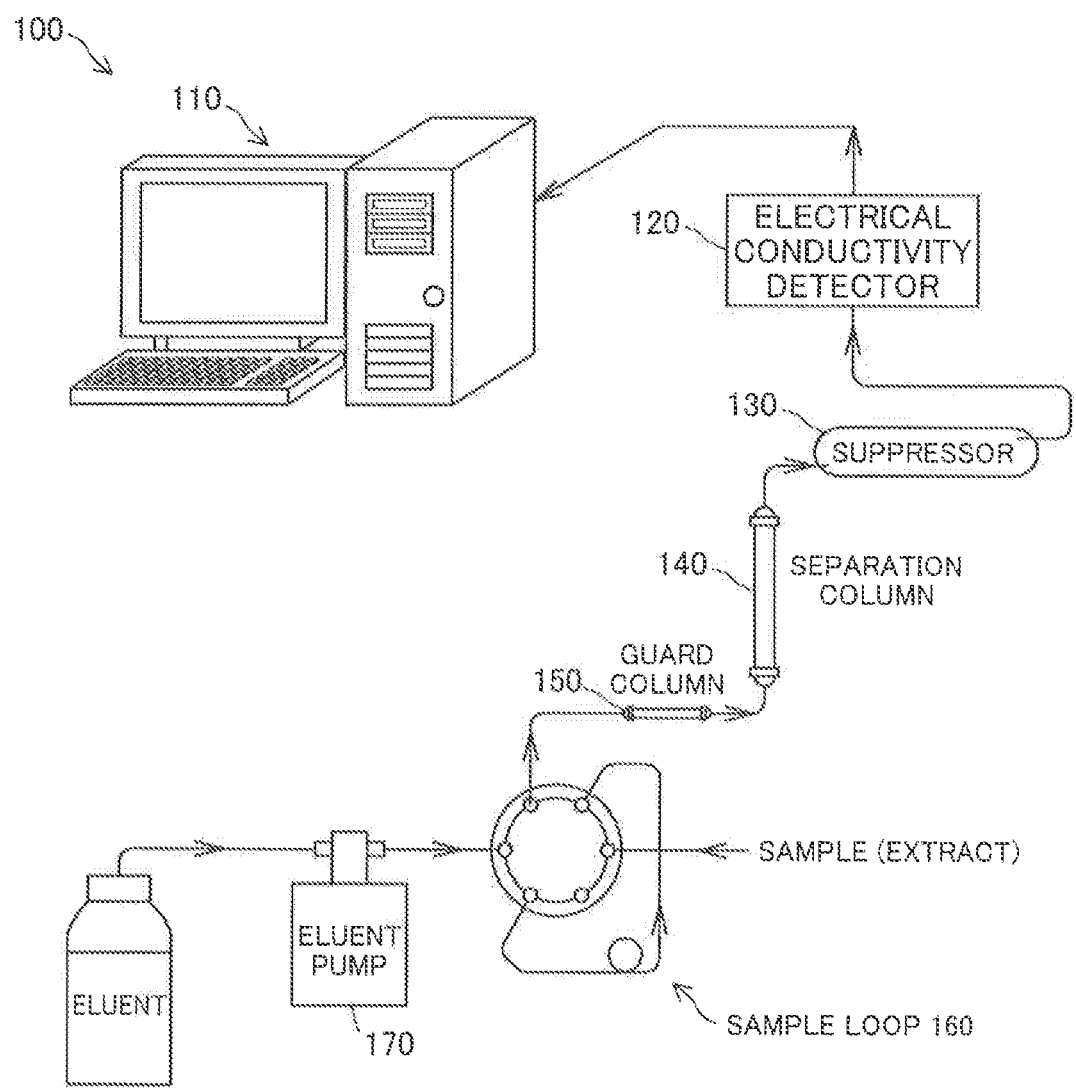
FIG. 9 is a diagram illustrating one example of an analyzer for analyzing the ion component by ion chromatography.

The procedure then analyzes the ion component included in the extract by ion chromatography to measure the amount of sulfate ion (step S246). FIG. 9 is a diagram illustrating one example of an analyzer for analyzing the ion component by ion chromatography (also called "ion chromatograph"). This analyzer 100 includes an eluent pump 170, a sample loop 160, a guard column 150, a separation column 140, a suppressor 130, an electrical conductivity detector 120 and an analysis computer 110 by ion chromatography.

The extract as the sample is injected into the sample loop 160, is transmitted with the eluent, which is fed by the eluent pump 170, through the guard column 150 to the separation column 140 and is separated by the strength of interaction with a filler in the separation column 140 (mainly ion exchange action). The suppressor 130 suppresses the electrical conductivity of the eluent, in order to prevent the electrical conductivity of the eluent from affecting the electrical conductivity of the ion component in the extract. The ion component of the extract separated by the separation column 140 is measured by the electrical conductivity detector 120. The measurement result by the electrical conductivity detector 120 is analyzed by the analysis computer 110 to give a chromatogram. The amount of sulfate ion in the test piece is determined from this chromatogram. The amount of sulfate ion included in the entire electrode catalyst layer may be determined by estimation of the value corresponding to the size of the electrode catalyst layer from the amount of sulfate ion in the test piece.

Figure 10:
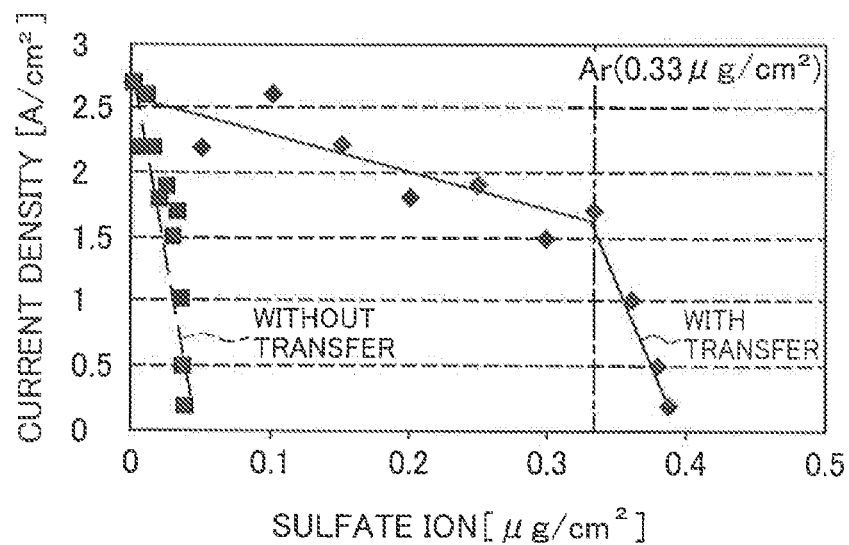
FIG. 10 is a graph showing a relationship between amount, of sulfate ion included in an electrode catalyst layer and output current density of a fuel cell using the electrode catalyst layer.

FIG. 10 is a graph showing one example of relationship between the amount of sulfate ion included in an electrode catalyst layer and the output current density of a fuel cell using the electrode catalyst layer. The amount of sulfate ion is an amount per unit area of the electrode catalyst layer (electrode catalyst layer having the thickness of 10 measured by the procedure of measuring the amount of sulfate ion described above. The amount of sulfate ion may be increased with an increase in drying temperature of the catalyst ink and decreased with a decrease in drying temperature as described above. The amount of sulfate ion may also be increased with an increase in drying time duration of the catalyst ink and decreased with a decrease in drying time duration.

As shown in FIG. 10, the output current density decreases with an increase in amount of sulfate ion. More specifically, the output current density has a higher decrease rate when the amount of sulfate ion is larger than a certain amount of sulfate ion Ar (0.33 µg/cm$^2$ in this example) as the boundary (inflection point). The output current density has a lower decrease rate when the amount of sulfate ion is equal to or less than the certain amount of sulfate ion Ar. Accordingly controlling the amount of sulfate ion in the electrode catalyst layer to be equal to or less than the amount of sulfate ion Ar as the inflection point suppresses the decrease of the output current density and thereby reduction in output of a resulting fuel cell. This amount of sulfate ion Ar is set to the reference value Ar, and the inspection process of FIG. 7 determines whether the measured amount of sulfate ion is equal to or less than the reference value Ar at step S250 as described above.

When the measured amount of sulfate ion is larger than the reference value Ar, the electrode catalyst layer is judged to provide poor output and evaluated as unusable defective product (NG product) (step S260b). When the measured amount of sulfate ion is equal to or less than the reference value Ar, on the other hand, the electrode catalyst layer is judged to provide good output and evaluated as usable good product (OK product) (step S260a). The electrode catalyst layer sheet roll Car evaluated as OK product is used for production of a catalyst coated membrane (CCM) described below.

The amount of sulfate ion Ar as the inflection point (reference value Ar) differs according to the conditions of preparing the catalyst ink (for example, catalyst-supported particles, solvent and the composition of ionomer) and the conditions of soaking the test sample in warm water and may thus be determined experimentally according to the conditions of the catalyst ink used and warm water immersion. The reference value Ar (=0.33 µg/cm$^2$) in FIG. 10 is only illustrative, and it is generally preferable to set the reference value Ar in the range of 0.2 to 0.35.

In the inspection of the electrode catalyst layer described above, the amount of sulfate ion in the electrode catalyst layer is measured by transferring the electrode catalyst layer onto the transfer sheet TCS. This is for the purpose of causing a surface of the electrode catalyst layer that is in contact with a gas diffusion layer in production of a membrane electrode assembly to be directly exposed to warm water in warm water immersion and thereby enhancing the extraction accuracy of sulfate ion on the surface. As described previously, a radical scavenger (for example, cerium oxide) that is eluted in the presence of sulfate ion and leads to poisoning of the electrode catalyst layer is included in the gas diffusion layer. The sulfate ion on the surface of the electrode catalyst layer that is in contact with the gas diffusion layer is thus expected to have significant effect. The heating process in the process of transfer of the electrode catalyst layer onto the transfer sheet TCS is expected to enhance the extraction accuracy of sulfate ion included in the transferred electrode catalyst layer. As shown in FIG. 10, measurement of the amount of sulfate ion using an extract of a test piece obtained by cutting the electrode catalyst layer sheet roll Csr (measurement without transfer) has the lower measurement accuracy of the amount of sulfate ion, compared with measurement with transfer. This leads to a failure in specifying the amount of sulfate ion Ar as the inflection point with high accuracy. A test piece obtained by the heating process without transferring the electrode catalyst layer onto the transfer sheet TCS allows for measurement of the amount of sulfate ion with high accuracy. Transferring the electrode catalyst sheet onto the transfer sheet TCS however, preferable, since the surface of the electrode catalyst layer that is in contact with the gas diffusion layer is directly exposed to warm water for extraction.

As described above, at step S200 in FIG. 1, the electrode catalyst layer used for production of a catalyst coated membrane described below provided by producing the electrode catalyst layer (as shown in FIGS. 2 to 4) and examining the produced electrode catalyst layer (as shown in FIGS. 7 to 10).

Figure 11:
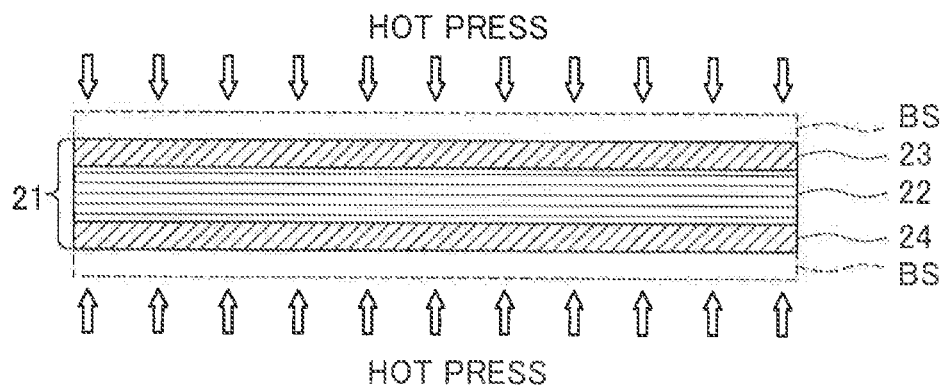
FIG. 11 is a diagram illustrating a catalyst coated membrane produced by using an electrolyte membrane and electrode catalyst layers.

FIG. 11 is a diagram illustrating a catalyst coated membrane produced by using the electrolyte membrane and the electrode catalyst layers. At step S300 in FIG. 1, the electrode catalyst layers 23 and 24 provided at step S200 are placed on the respective surfaces of the electrolyte membrane 22 provided at step S100 and are hot pressed. This provides a catalyst coated membrane 21 that has the electrode catalyst layer 23 formed on (joined with) one surface of the electrolyte membrane 22 and the electrode catalyst layer 24 formed on the other surface of the electrolyte membrane 22.

At step S400 in FIG. 1, gas diffusion layers used for production of a membrane electrode assembly are provided. The gas diffusion layers are made of a gas-permeable conductive material, for example, carbon porous material such as carbon cloth or carbon paper or a metal porous material such as metal mesh or metal foam. The gas diffusion layers are impregnated with a radical scavenger (for example, cerium oxide).

Figure 12:
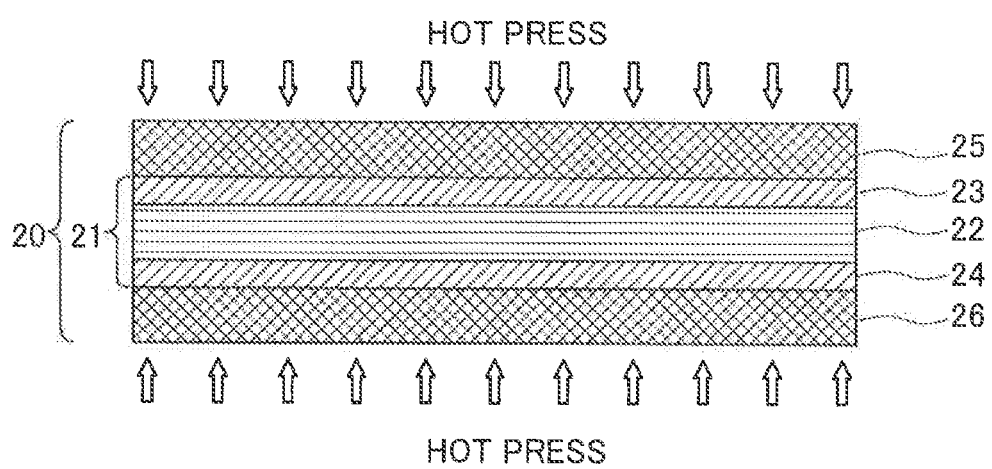
FIG. 12 is a diagram illustrating a membrane electrode assembly produced by using the catalyst coated membrane and gas diffusion layers.

FIG. 12 is a diagram illustrating a membrane electrode assembly produced by using the catalyst coated membrane and the gas diffusion layers. At step S500 in FIG. 1, the gas diffusion layers 25 and 26 provided at step S400 are placed on the respective surfaces of the catalyst coated membrane 21 produced at step S300 and are hot pressed. This provides a membrane electrode assembly 20 that has the gas diffusion layer 25 formed on (joined with) a surface of the electrode catalyst layer 23 of the catalyst coated membrane 21 and the gas diffusion layer 26 formed on a surface of the electrode catalyst layer 24 of the catalyst coated membrane 21. The catalyst coated membrane 21 may be called "membrane electrode assembly", and the membrane electrode assembly 20 may be called "membrane electrode and gas diffusion layer assembly (MEGA).

For the simple explanation, FIG. 11 illustrates producing the catalyst coated membrane from the electrode catalyst layers and the electrolyte membrane in the sheet form, and FIG. 12 illustrates producing the membrane electrode assembly from the catalyst coated membrane and the gas diffusion layers in the sheet form. The invention is, however, not limited to this configuration. Long electrode catalyst layers may be hot pressed on a long electrolyte membrane, or a plurality of electrode catalyst layers in the sheet form may be hot pressed on a long electrolyte membrane at predetermined intervals. Additionally, a plurality of gas diffusion layers in the sheet form may be further hot pressed at predetermined intervals. This produces a continuous sheet of a plurality of membrane electrode assemblies, which may be subsequently cut into individual pieces.

Figure 13:
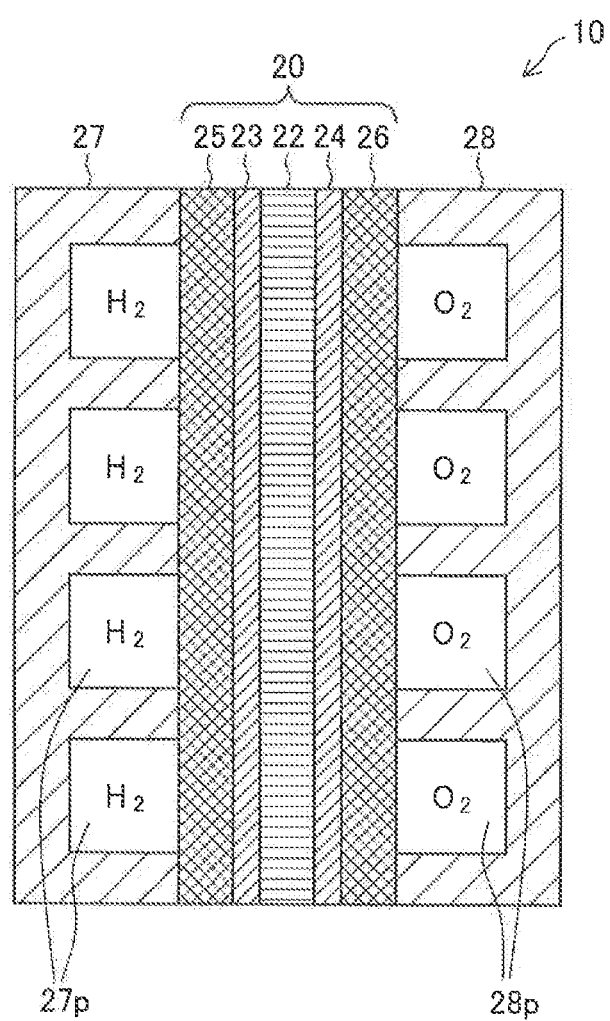
FIG. 13 is a diagram illustrating a fuel cell configured by using the membrane electrode assembly.

FIG. 13 is a diagram illustrating a fuel cell configured by using the membrane electrode assembly. A fuel cell 10 is configured by placing the membrane electrode assembly 20 shown in FIG. 12 between a separator 27 located on the anode (electrode catalyst layer 23 and gas diffusion layer 25) side and a separator 28 located on the cathode (electrode catalyst layer 24 and gas diffusion layer 26) side.

The separators 27 and 28 are made of a gas-impermeable conductive material, for example, dense carbon obtained by compressing carbon to be gas impermeable or press-molded metal plate. Surfaces of the separators 27 and 28 placed to be in contact with the membrane electrode assembly 20 have concavity and convexity to form flow paths for a fuel gas and an oxidizing gas. More specifically, fuel gas flow paths 27p for the flow of fuel gas ($H_2$) subjected to the electrochemical reaction at the anode are formed between the gas diffusion layer 25 and the separator 27 on the anode side. Oxidizing gas flow paths 28p for the flow of oxidizing gas ($O_2$ or more specifically the air including $O_2$) subjected to the electrochemical reaction at the cathode are formed between the gas diffusion layer 26 and the separator 28 on the cathode side.

In the actual use, fuel cells are generally used in the form of a fuel cell stack having the stacked structure of a plurality of the fuel cells 10 shown in FIG. 13.

In the embodiment described above, the drying temperature is set to be lower than the boiling point of the solvent in the process of manufacturing the electrode catalyst layer or more specifically in the process of drying the coated layer of catalyst ink, so as to suppress generation of sulfate ion by combustion of the solvent. This allows for production of the electrode catalyst layer that has the reduced amount of sulfate ion generated in the process of manufacturing the electrode catalyst layer.

The amount of sulfate ion in the produced electrode catalyst layer is measured, and the electrode catalyst layer having the amount of sulfate ion that is equal to or less than the specified reference value is used for production of the membrane electrode assembly. The reference value is an amount of sulfate ion (for example, 0.33 µg/cm$^2$) at an inflection point of output current density obtained from a relationship that is specified in advance between the amount of sulfate ion included in the electrode catalyst layer in unused state and the output current density of a fuel cell using the electrode catalyst layer (as shown in FIG. 10). This suppresses the electrode catalyst layer from being poisoned by sulfate ion included in the electrode catalyst layer in the initial stage in the fuel cell using the membrane electrode assembly. This accordingly suppresses reduction of the proton conductivity of the electrode catalyst layer and increase in impedance of the electrode of the membrane electrode assembly, thus suppressing reduction of the power generation performance of the fuel cell.

In the catalyst coated membrane 21 shown in FIG. 11 and in the membrane electrode assembly 20 shown in FIG. 12, both the electrode catalyst layers 23 and 24 on the respective sides of the electrolyte membrane 22 have the amounts of sulfate ion equal to or less than the reference value Ar (0.33 µg/cm$^2$ in the above example). According to a modification, only either one of the electrode catalyst layers 23 and 24 may have the amount of sulfate ion equal to or less than the reference value Ar.

In the embodiment described above, the electrode catalyst layers 23 and 24 are produced by coating the sheet BS with the catalyst ink and drying the catalyst coated sheet (as shown in step S220 in FIG. 2 and FIG. 3). One modification may produce the electrode catalyst layer without using the sheet BS by directly coating the electrolyte membrane 22 with the catalyst ink and drying the catalyst coated electrolyte membrane 22. This modification forms electrode catalyst layers 23 and 24 by coating the electrolyte membrane 22 with the catalyst ink and drying the catalyst coated electrolyte membrane 22 so as to form the catalyst coated membrane 21, while the embodiment joins the electrode catalyst layers 23 and 24 with the electrolyte membrane 22 by hot pressing so as to form the catalyst coated membrane 21 (shown in step S300 in FIG. 1 and FIG. 11).

In the fuel cell 10 shown in FIG. 13, the channel-like gas flow paths 27p and 28p are formed in the separators 27 and 28 which are arranged across the membrane electrode assembly 20. This configuration is, however, not restrictive. Gas flow paths, for example, porous gas flow paths, may be provided separately between the separators and the membrane electrode assembly. Such gas flow paths may be provided separately between either one of the separators and the membrane electrode assembly.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A method of manufacturing a membrane electrode assembly that has an electrode catalyst layer formed on a surface of an electrolyte membrane, the method comprising:
   producing the electrode catalyst layer formed in the membrane electrode assembly by a drying process that dries a catalyst ink which includes catalyst-supported particles having a catalyst metal supported thereon, a solvent, and an ionomer, at a predetermined temperature; and
   after the drying process, measuring an amount of sulfate ion included in the produced electrode catalyst layer and evaluating an electrode catalyst layer having the measured amount of sulfate ion that is equal to or less than a specified reference value, as a good product, wherein
   the reference value is 0.33 pg/cm2,
   the catalyst ink includes a plurality of different solvents having different boiling points,
   the predetermined temperature is set to be lower than the boiling point of the solvent having the lowest boiling point among the plurality of different solvents, and
   the catalyst ink includes a first solvent having a first boiling point and a second solvent having a second boiling point higher than the first boiling point, and
   wherein the drying process comprises:
      a first heating process that sets the predetermined temperature to a temperature that is higher than the first boiling point and lower than the second boiling point for a first time duration, the first solvent being completely evaporated by the end of the first time duration;
      a second heating process that is performed after the first heating process and sets the predetermined temperature to be higher than the predetermined temperature in the first heating process and higher than the second boiling point for a second time duration, the second solvent being completely evaporated by the end of the second time duration;
      a third heating process that is performed before the first heating process and sets the predetermined temperature to a temperature that is lower than the first boiling point; and
      a fourth heating process that is performed after the second heating process and sets the predetermined temperature to be higher than the temperature in the second heating process.

2. The method of manufacturing the membrane electrode assembly according to claim 1,
   wherein the reference value is an amount of sulfate ion corresponding to an inflection point of output current density obtained from a relationship that is specified in advance between amount of sulfate ion included in the electrode catalyst layer in unused state and output current density of a fuel cell using the electrode catalyst layer.

* * * * *